US006968500B2

(12) United States Patent
Mikhailov et al.

(10) Patent No.: US 6,968,500 B2
(45) Date of Patent: Nov. 22, 2005

(54) AUTOMATIC FORMS HANDLING SYSTEM

(76) Inventors: Dmitry Mikhailov, 1434 Burnaby Street, Vancouver, BC (CA) V6G1W8; Sanford Lack, 20 Angus Trail, Atlanta, GA (US) 30328

(*) Notice: Subject to any disclaimer, the term of this patent is extended or adjusted under 35 U.S.C. 154(b) by 694 days.

(21) Appl. No.: 09/826,037

(22) Filed: Apr. 4, 2001

(65) Prior Publication Data

US 2001/0054046 A1   Dec. 20, 2001

Related U.S. Application Data

(60) Provisional application No. 60/194,732, filed on Apr. 5, 2000.

(51) Int. Cl.$^7$ ............................................. G06F 7/00
(52) U.S. Cl. ................................... 715/505; 707/102
(58) Field of Search .............................. 715/505, 506, 715/530; 707/102; 345/966

(56) References Cited

U.S. PATENT DOCUMENTS

| | | | |
|---|---|---|---|
| 5,557,787 A * | 9/1996 | Shin et al. ................... | 707/102 |
| 5,819,254 A * | 10/1998 | Kawai ........................ | 707/102 |
| 5,832,496 A * | 11/1998 | Anand et al. ................ | 707/102 |
| 5,970,464 A * | 10/1999 | Apte et al. ................... | 705/4 |
| 6,397,221 B1 * | 5/2002 | Greef et al. ................. | 707/102 |
| 6,415,284 B1 * | 7/2002 | D'Souza et al. ............. | 707/3 |
| 6,665,685 B1 * | 12/2003 | Bialic ......................... | 707/102 |
| 2003/0208108 A1 * | 11/2003 | Shewmake et al. ......... | 600/300 |

OTHER PUBLICATIONS

Jennings, Roger—Special Edition Using Microsoft Access 2000 (Que Publishing, May 5, 1999).*
Jones, Dennis et al., Special Edition Using Microsoft FrontPage 2000, Chapter 39—Using Databases with FrontPage 2000 "Capturing Data from Forms" (Que Publishing, © May 17, 1999).*
Wempen, Faithe, Sams Teach Yourself Microsoft Access 2000 in 10 Minutes, Lesson 5—Creating a New Database "Creating a Database with Database Wizard" (Sams Publishing, © Apr. 27, 1999).*

* cited by examiner

*Primary Examiner*—Doug Hutton
(74) *Attorney, Agent, or Firm*—Michael J. Mehrman; Mehrman Law Office P.C.

(57) ABSTRACT

An automatic forms handling application service provided on a global computer network, such as the Internet. A forms publisher submits a form and an associated report to the forms handling system. The form includes one or more data submission fields for accumulating data entries submitted into the form by visitors to the forms handling system. The report includes report elements for returning tabulated data entries accumulated using the form. The forms handling system automatically creates a database table corresponding to the form, and correlates each form submission field with a database storage element, such as a column in the database table, that accumulate data entries for its associated form submission field. The forms handling system also coordinates the database table with the associated report file, and periodically generates and delivers reports to the a specified location in accordance a service definition provided by the form publisher.

25 Claims, 10 Drawing Sheets

FORM "A" - AUTOMOBILE QUESTIONAIRE — 40

- 42 → ANNUAL INCOME: 50,000 — 52
- 44 → NUMBER IN HOUSEHOLD: 4 — 54
- 46 → ANNUAL MILES DRIVEN: 16,000 — 56
- 48 → TYPE OF AUTOMOBILE: SEDAN — 58
- 50 → AGE OF AUTOMOBILE (YR): 1.5 - 2.0 — 60

SUBMISSION "A" — 62

FIG. 2

SUBMISSION "A" — 62

TABLE "A" - AUTOMOBILE QUESTIONAIRE — 63

| COLUMN 1 | COLUMN 2 | COLUMN 3 | COLUMN 4 | COLUMN 5 |
|---|---|---|---|---|
| 50,000 | 4 | 16,000 | SEDAN | 1.5 - 2.0 |
| RECORD 2 | RECORD 2 | RECORD 2 | RECORD 2 | RECORD 2 |
| ⋮ | ⋮ | ⋮ | ⋮ | ⋮ |
| RECORD N | RECORD N | RECORD N | RECORD N | RECORD N |

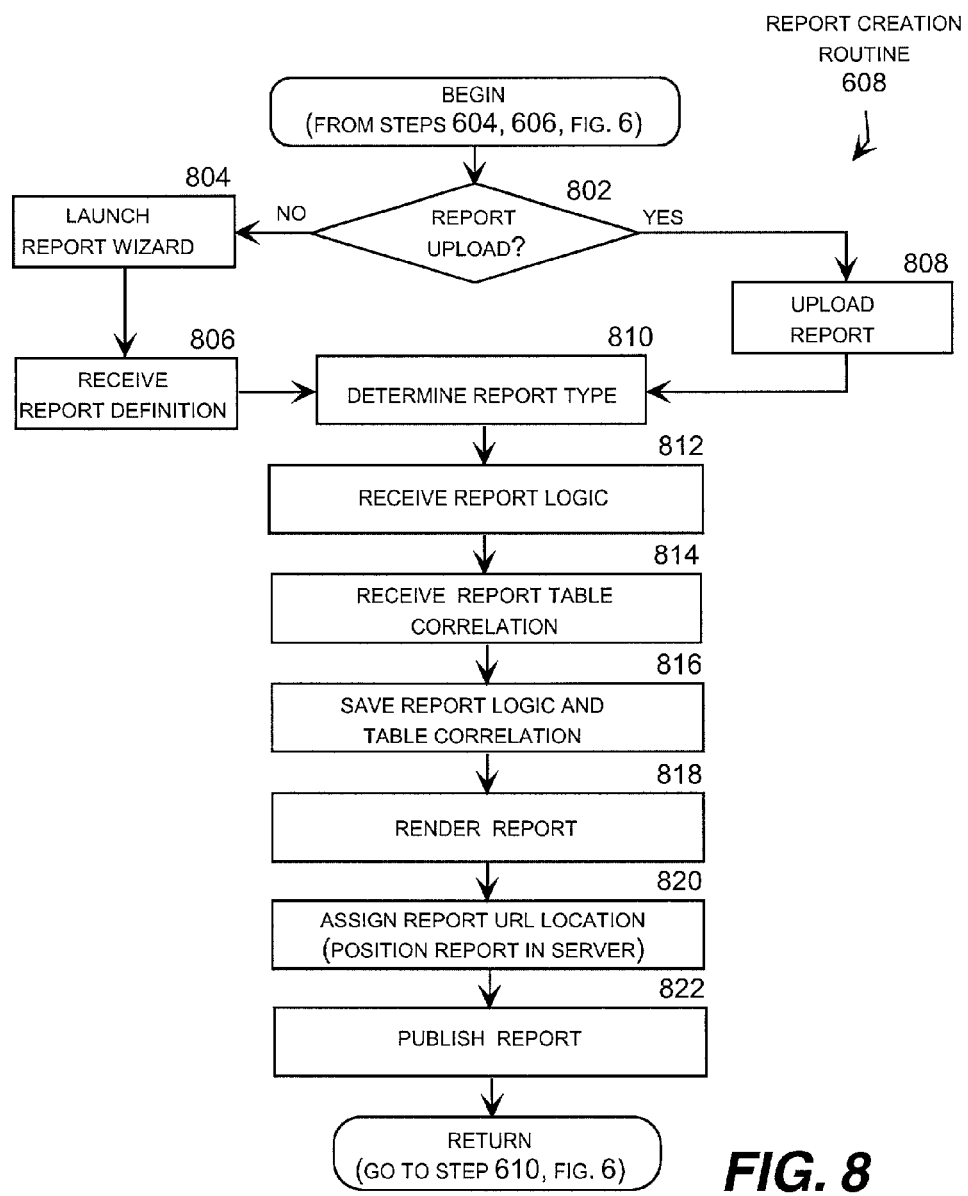

AUTOMATIC FORMS HANDLING SYSTEM

This application claims the benefit of provisional application No. 60/194,732 filed Apr. 5, 2000.

TECHNICAL FIELD

This invention relates generally to the field of network-based application services and, more particularly, to an automatic forms handling system configured to automatically create a database schema corresponding to a received form, publish the form for data submissions, record the data submissions in the database table or other database structure, and produce reports based on the data stored in the table.

BACKGROUND OF THE INVENTION

Many types of data-entry forms are used for a wide variety of applications. In this context, a "form" is a document that includes one or more structured data submission fields that a user may fill in with data entries to create a form submission. Common examples include political polling surveys, consumer preference surveys, order forms for goods and services, warranty cards, employment applications, and so forth. The reliance on form-based data handling is on the rise due in large part to the increasing popularity of the Internet and other forms of on-line communication. This is because data-entry forms are a convenient way for conducting structured on-line communications designed to solicit and accumulate data entries in response to specific written inquiries.

On-line data-entry forms are usually a lower-cost alternative to other methods for conducting structured communications, such as direct mail solicitation, telephone interviews, and in-person interviews. For this reason, many companies and individuals are turning to on-line data-entry forms to replace structured communications that were previously conducted through other media. In addition, many entities are finding new applications for on-line data-entry forms, such as gathering electronic marketing data, bill presentation and payment systems, insurance claims submission, census taking, absentee ballot collection, on-line shopping, meeting scheduling, shareholder balloting, and countless other applications.

Although on-line data-entry forms are often a lower-cost alternative to other types of structured communications, forms present their own challenges to the form publisher. In fact, the proliferation of applications using on-line data-entry forms, and the proliferation of large-scale forms systems in particular, has revealed a number of difficult challenges for forms administration. First, the form itself must be created. Although many word processing and publication application programs may be used to create data-entry forms, a form designer requires time and experience to develop a talent for skillful form design.

Second, a database file must usually be designed to accumulate data entries received through form submissions. Again, although many suitable database application programs are available, the form designer must become skillful in operation of the database application, and the coordination of the database files with the data-entry forms. Similarly, a report is typically required to present the accumulated data entries in a meaningful way. And again, the form designer must become skillful in the development of effective report formats, and in the coordination of the database files with the report formats.

A significant investment in computer hardware and software may also be required to implement a forms system. As noted above, an application program for creating the forms, a database application program, and an application program for creating the reports are typically required. In addition, sufficient computer memory is required to store the forms, the submissions, and the related reports. One of the challenges may often be the maintenance of sufficient communication bandwidth to ensure that visitors to the forms server can access the forms and enter a form submission in a reasonable amount of time. This is particularly important for voluntary submission systems, such as e-commerce and marketing survey applications, because consumers have little patience for failed attempts to access a forms server.

As a result, a significant investment in hardware, software, and training is typically required to successfully deploy even a small to medium sized forms application. Many entities will inevitably over-design or under-design their forms systems, resulting in inefficient systems and lost opportunities. Some entities may not have sufficient investment capital available to install a suitable forms systems, and others will lose valuable business opportunities while their forms systems are being configured and deployed. In addition, the installation of an individual forms system for every entity that elects to install a forms system will proliferate the number of small to medium sized forms systems, which will avoid an economy of scale that could be attained through a centralized forms administration system.

Thus, there is a need in the art for a method and system for improved forms administration. Specifically, there is a need for a system that overcomes the need for a significant investment in hardware, software, and training that is presently required to successfully deploy a forms application.

SUMMARY OF THE INVENTION

The present invention meets the needs described above in a centralized, network-based automatic forms handling system. The system includes all of the application software needed to create a forms system, including a forms wizard that can be used to create forms, a reports wizard that can be used to create reports, and a database application program that can be used to house the forms, the submissions, and the reports. The forms handling system also includes sufficient hardware and communication resources for a large number of forms systems. This allows many users to share the hardware and software resources of the centralized, network-based automatic forms handling system without having to invest in duplicative resources on their respective client ends. Thus, the subject invention overcomes the need for an individual form publisher to undertake a significant investment in hardware, software, and training before deploying a forms application.

The automatic forms handling system is also configured to automatically create a database table for a corresponding form. Thus, the forms publisher may simply upload an existing form without having any knowledge or skill of the infrastructure needed to administer the form. The form publisher may also specify service definitions specifying form logic, instructions for processing form submissions, and instructions for periodically generating and delivering reports. This gives even the most unsophisticated form publisher the ability to easily and quickly design and deploy a highly sophisticated forms system using only a thin client application program, such as a browser.

The automatic forms handling system also presents form publishers with a number of other advantages, including the ability to upload forms in a variety of formats, such as HTML, XML, PDF, and word processing formats. The forms handling system may also receive communications from form publishers and visitors through a variety of communication devices, including computers, landline telephones, wireless telephones, and digital broadband devices. In addition, the forms handling system allows the form publisher to screen individual form submissions, if desired, before the form submissions are entered into the corresponding database table. The publisher may also specify a variety of destinations for reports, including storage in a specified location on the forms handling system, e-mail delivery, or hard copy delivery to a specified location. The form publisher may also update the forms and associated reports from time to time. Many other advantages and useful techniques for implementing a forms system using the subject invention will become apparent to those skilled in the art.

Generally described, the invention includes a method and system for handling forms. The forms handling system receives a form from a form publisher. This form includes one or more data submission fields configured to receive user input. The forms handling system processes the form to identify the data submission fields and correlating each data field to a database field type supported by a database application. The forms handling system then creates database tables or other database structures in the database application corresponding to the form. This database table or structure includes a storage element, such as a column in the table, corresponding to each data submission field. The forms handling system then publishes the form to receive form submissions including data entries into the data submission fields of the form. The forms handling system receives one or more form submissions from visitors accessing the forms system. The forms handling system enters the data entries of the form submissions into the corresponding storage elements of the database structure.

In addition, the forms handling system typically receives a report file associated with the form. This report file includes report elements associated with the storage elements of the database. Periodically and in accordance with service definitions received from the form publisher, the forms handling system computes the report elements from the data entries associated with the storage elements of the database structure, renders the report, and delivers the report to a specified location. The form may be uploaded from a remote form publisher, or the form may be created on-line using a forms wizard provided by the forms handling system. Similarly, the corresponding report may be uploaded from a remote form publisher, or the report may be created on-line using a reports wizard provided by the forms handling system.

More specifically described, the forms handling system processes the form to identify the data submission fields by parsing the form to identify the data submission fields, determining a field type associated with each data submission field; and determining a name associated with each data submission field. The forms handling system then looks up a selected database field type corresponding to each data submission field, and correlates each data submission field with its corresponding selected database field type. In particular, the forms handling system typically looks up a default database field type and a list of database field type options corresponding to each data submission field, and then prompts the form publisher to enter a selected database field type from the list of database field type options for each data submission field. If the publisher does not make a selection, the forms handling system assigns the default database field type to the corresponding form data submission field.

As an optional feature, the forms handling system may forward each form submissions to the form publisher for review without entering the submission into the corresponding database table. The forms handling system may subsequently receive approval of a particular form submission from the form publisher, and enter that form submission into the corresponding storage elements of the database.

The forms handling system may also receive form logic defining conditions associated with the receipt of form submissions using the form. The forms handling system saves the form logic in association with the database table or other structure corresponding to the form, and applies the form logic when receiving form submissions using the form. The form logic typically includes conditions defining valid data entries for individual data submission fields, and conditions defining a valid form submission based on a combination of data entries for several data submission fields.

Turning to a typical software architecture for the subject invention, the forms handling system includes a document handler that receives forms and associated report files. The forms handling system also includes a forms database that stores forms received through the document handler, and a reports database that stores reports received through the document handler. The forms handling system also includes a table loader that creates a database table or other structure corresponding to each form, and a forms manager that receives one or more form submissions associated with each form and enters data entries received through each form submission into the corresponding database. The forms manager also receives a service definition associated with each form, and produces and delivers reports for a form in accordance with instructions contained in a corresponding service definition.

The forms handling system also includes an interface system operable for receiving service definitions from communication devices, such as landline telephones, wireless telephones, computers, and digital broadband devices. The document handler can process a variety of document types, such as HTML documents, PDF documents, XML documents, and various types of word processing documents.

That the invention improves over the drawbacks of prior forms administration systems and accomplishes the advantages described above will become apparent from the following detailed description of embodiments of the subject invention and the appended drawings and claims.

BRIEF DESCRIPTION OF THE DRAWINGS

FIG. 2 illustrates data-entry form and an associated form submission.

FIG. 3 illustrates a database structure, a table in this example, including a record corresponding to the form submission illustrated in FIG. 2.

FIG. 7B illustrates a correlation table for associating form field types with database field types in an automatic forms handling system.

FIG. 8 is a logic flow diagram illustrating a report creation routine for an automatic forms handling system.

DETAILED DESCRIPTION OF THE EMBODIMENTS

Figure 1:
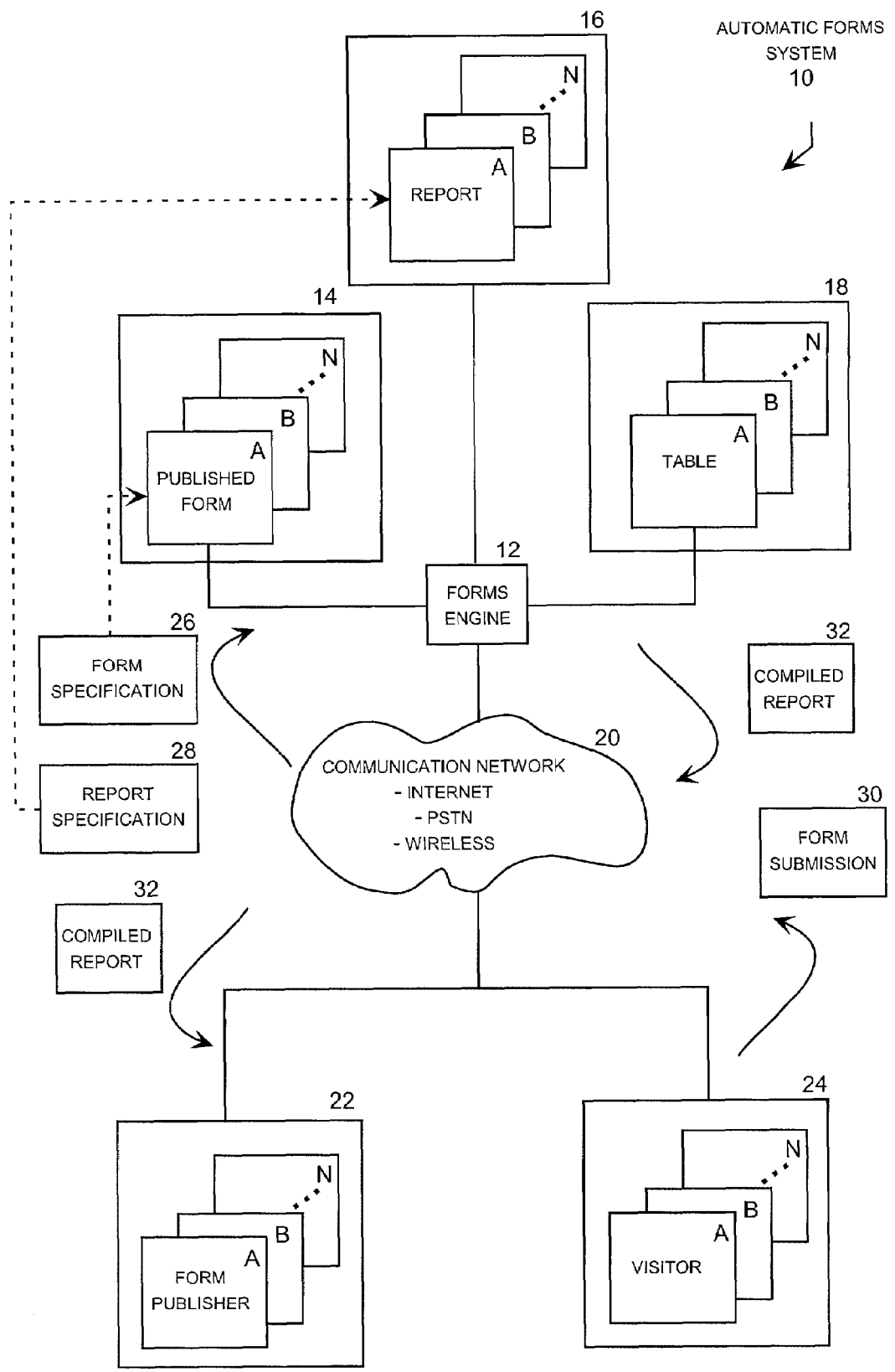
FIG. 1 is a functional block diagram illustrating an automatic forms handling system.

The invention is preferably implemented as an automatic forms handling application service provided on a global computer network, such as the Internet. A form publisher submits a form and an associated report to the forms handling system. The form includes one or more data submission fields for accumulating data entries submitted into the form by visitors to the forms handling system. The report includes report elements for returning tabulated data entries accumulated using the form. The forms handling system automatically creates a database table or other structure corresponding to the form, and correlates each form submission field with a database storage element, such as a column in the database table, that accumulate data entries for its associated form submission field. The forms handling system also coordinates the database table with the associated report file, and generates and delivers reports periodically or on demand to the a specified location in accordance a service definition provided by the form publisher. Reports can be viewed simply by clicking on the link in the report menu or by opening specific URL.

The service definition provided by the form publisher may also include form logic for the various data submission fields, such as data types and ranges. The service definition may also include form logic for a valid form submission, such as required fields. The service definition may also specify special submission handling instructions, such as an instruction to e-mail each submission to the form publisher for review before entering the submissions into the database table or other database structure. These form service definitions may be conveniently saved as metadata associated with the corresponding database table. Optionally, the form handling system may perform other services for the form publisher, such as archiving form records, providing professional advice or services in the construction of forms and reports, and advertising the availability of the forms for submissions.

Although the subject invention is preferably deployed on the Internet, it may also be deployed on other computer networks, such as intranets, LAN, WAN, WAP, and other network systems. Typically, form publishers access the forms handling system using a thin client, such as a browser. Form publishers can upload forms and reports created in a variety of formats, including HTML, XML, PDF and word processing formats. Alternatively, form publishers may design their forms and associated reports on-line using a forms wizard and a reports wizard provided by the forms handling system. However, the forms handling system is not limited to the document formats listed above. Those skilled in the art will appreciate that the forms handling system may support other document formats using the techniques described in this specification.

The forms handling system also supports a variety of user communication devices, such as telephones, computers, digital broadband devices, and so forth. Again, the forms handling system is not limited to the user communication device listed above. Those skilled in the art will appreciate that the forms handling system may support other user communication device using the techniques described in this specification. Similarly, the software architecture for the illustrative embodiment includes a forms manager, a document handler, and table loader, a database application, a word processing application, and an interface system. Those skilled in the art will appreciate that the forms handling system may be implemented in a different software architecture that performs the functions described in this specification.

With respect to the business aspects of the subject invention, the forms handling system may generate revenue through a variety of fee techniques. For example, form publishers may pay a fee for each form published, each report received, or each submission handled. Form publishers may also obtain optional services on a fee basis, such as use of the forms and reports wizards, or use of professional services for forms or report design. Furthermore, customers will need to access the forms on the forms handling system's server. Therefore, the form's handling system will have to assign URL based location identifiers to enable the customers to locate the form. Some URL based location identifiers will be more desirable than others. The forms handling system may charge a higher fee for these more desirable URL based location identifiers. In some cases, visitors entering form submissions may be charged a fee on a per-submission basis. Advertising revenues may also be generated through the sale of banner add space, and referral revenues may be generated through referral link charges. In addition, the forms handling system will accumulate a large store of information relating to the users of the forms handling system. This information store may be made available to advertisers or other interested parties on a fee basis. Those skilled in the art will appreciate that other business models may be implemented in association with the forms handling system.

Turning now to the figures, in which like numerals indicate like elements throughout the several figures, FIG. 1 is a functional block diagram of an automatic forms handling system 10. The server side of the forms handling system 10 includes a forms engine 12, a database of published forms 14, a database of reports 16, and a database of tables 18. In this system, each published form in the database 14 has a corresponding report in the database 16, and a corresponding table in the database 18. Specifically, a published form includes one or submission fields for receiving data entries from visitors entering form submissions. The corresponding database table accumulates the form submissions received through its associated form. And the corresponding report includes report entries based on the data in the table that present the accumulated data in a meaningful way.

A communication network 20 connects the forms engine 12 with form publishers 22 and visitors 24. Many different form publishers may publish forms through the forms engine 12, and a larger number of visitors may enter form submissions into the published forms 14. A form publisher accesses the forms engine 12 via the communication network 20 and submits a form specification 26 and a report specification 28. The form and associated report may be uploaded or defined on-line using a forms wizard 120 (see FIG. 5) and a reports wizard 122 (see FIG. 5). The forms engine 12 automatically creates the table in the database 18, and correlates the data submission fields in the form to storage elements in the table, such as columns. The forms engine 12 also correlates the storage elements in the table to the corresponding report elements in the associated report. The forms engine 12 then publishes the form in the database 14 for the receipt of forms submissions 30 from visitors 24.

The forms publisher 22 also submits a service definition 29 to the forms engine 12. The service definition 29 includes instructions for periodically rendering a compiled report 26 and delivering the report to a specified location. For example, the compiled report 26 may be e-mailed to the form publisher, stored in the database 16 for access by the form publisher, printed in hard copy and mailed to a specified locations, or handles in any other manner specified by the form publisher. The service definition 29 also includes form logic to be implemented by the forms engine 12 when receiving forms submissions into the corresponding forms. For example, form logic may include required fields for a valid submission and data types and ranges for individual data entries. The service definition 29 may also include instructions for handling form submissions. For example, the form publisher may instruct the forms engine 12 to e-mail all form submissions to the form publisher for review and approval before entering the submissions into the corresponding database table.

FIG. 2 illustrates data-entry form 40 and an associated form submission. Specifically, this illustrative Form "A" is an automobile questionnaire. The form 40 includes five structured data inquiries: an "Annual Income" data inquiry 42, a "Number in Household" data inquiry 44, an "Annual Miles Driven" data inquiry 46, a "Type of Automobile" data inquiry 48, and an "Age of Automobile" data inquiry 50. The "Annual Income" data inquiry 42 has an associated data submission field 52, the "Number in Household" data inquiry 44 has an associated data submission field 54, the "Annual Miles Driven" data inquiry 46 has an associated data submission field 56, the "Type of automobile" data inquiry 48 has an associated data submission field 58, and the "Age of Automobile" data inquiry 50 has an associated data submission field 60.

FIG. 2 also illustrates a typical form submission 62 that a visitor might enter using the form 40. In this example, the visitor has entered "50,000" as a data entry into the data submission field 52, the data entry "4" into the data submission field 54, the data entry "16,000" into the data submission field 56, the data entry "SEDAN" into the data submission field 58, and the data entry "1.5–2.0" into the data submission field 60. It will be understood that the form 40 could include a wide variety of data submission fields, such as buttons, check boxes, pick lists, character fields, text fields, date-time fields and others.

FIG. 3 illustrates a database table 63 that includes a record 74 corresponding to the form submission 62 illustrated in FIG. 2. The table 63 includes a storage element, in this example a column, corresponding to each data submission field in the forms 40. Specifically, the storage element 64 corresponds to the data submission field 52, the storage element 66 corresponds to the data submission field 54, the storage element 68 corresponds to the data submission field 56, the storage element 70 corresponds to the data submission field 58, and the storage element 72 corresponds to the data submission field 60. In this format, each form submission corresponds to a record stored as a row in the table 63. For example, the form submission 62 shown in FIG. 2 is stored as the record in the row 74 in the table 63. Similarly, a second form submission may be stored as a record in the row 76, another form submission may be stored as a record in the row 78, and so forth.

Figure 4:
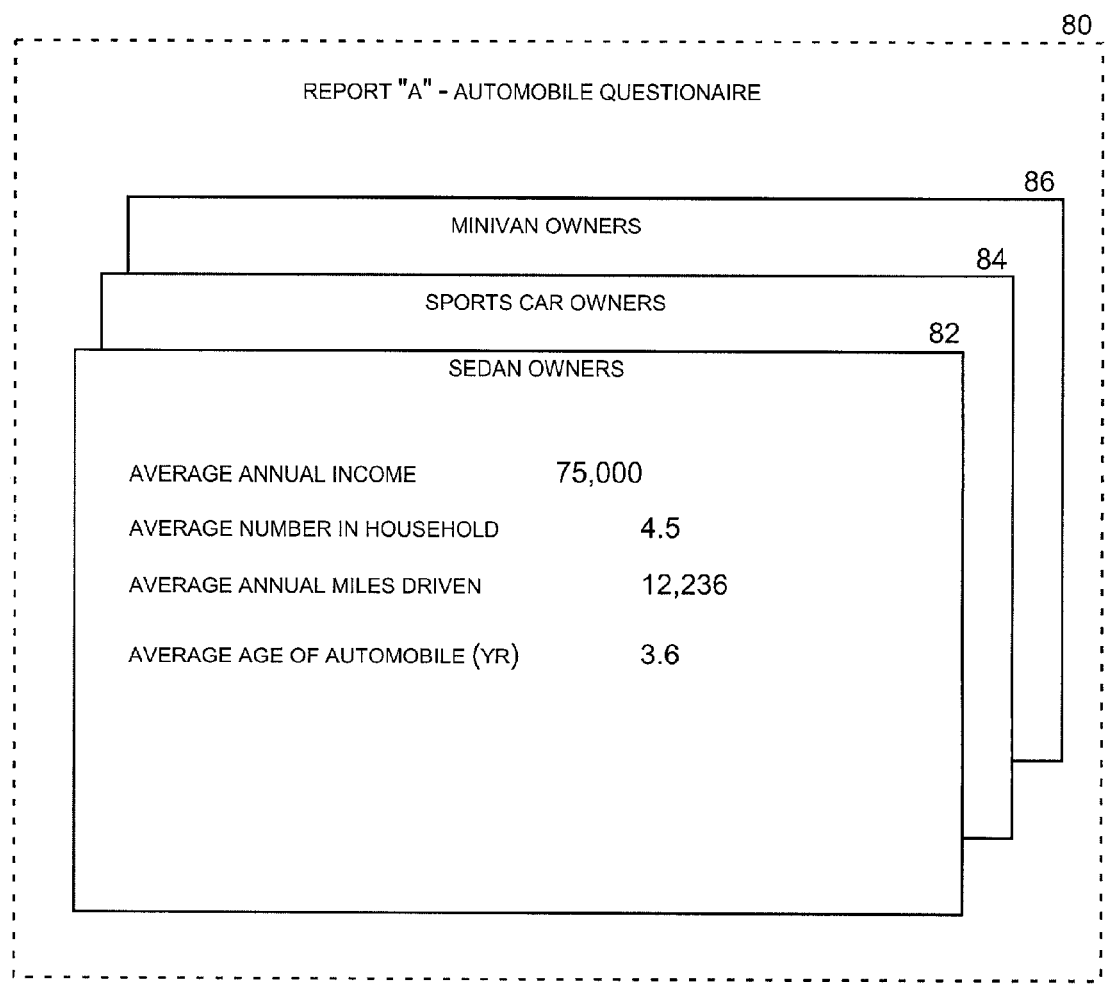
FIG. 4 illustrates a report file corresponding to the form illustrated in FIG. 2 and the database table illustrated in FIG. 3.

FIG. 4 illustrates a report file 80 corresponding to the form 40 illustrated in FIG. 2 and the database table 63 illustrated in FIG. 3. In this illustration, a first report table 82 is complied for sedan owners, a second report table 84 is complied for sports car owners, and a third report table 86 is complied for minivan owners. As a simple example, the report table 82 includes the entry "75,000" which represents the average annual income of sedan owners represented in the database table 63. Similarly, the report includes the entry "4.5"' which represents the average household size for sedan owners, the entry "12,236"' which represents the average annual miles driven for sedan owners, and the entry "3.6"' which represents the average automobile age in years for sedan owners. All of these report entries are computed from the data entries tabulated in the database table 63. Those skilled in the art will appreciate that many other report files may be defined, including sophisticated reports that include statistical grouping analyses, graphical data representations, animations, and so forth.

Figure 5:
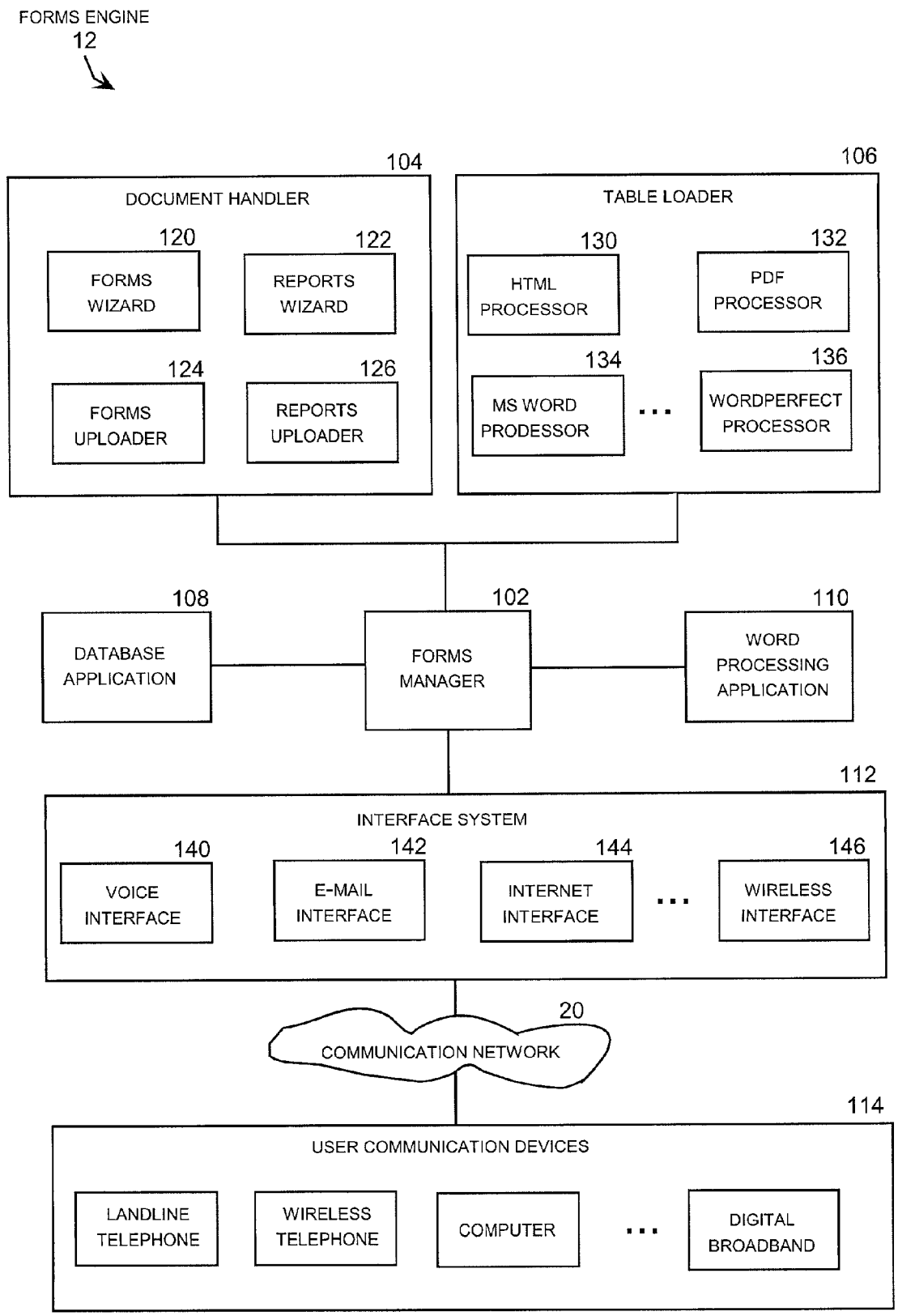
FIG. 5 is a functional block diagram illustrating typical software architecture for the forms engine of an automatic forms handling system.

FIG. 5 is a functional block diagram illustrating a typical software architecture for the forms engine 12. The forms engine 12 includes a forms manager 102, a document handler 104, a table loader 106, a database application program 108, a library of one or more word processing and desktop publishing application programs 110, and an interface system 112. Basically, the forms manager 102 controls the operation of the forms engine 12 including the implementation of service definitions, the document handler 104 controls the uploading and creation of forms and reports, the table loader 106 creates a database table to correlate received forms and associated reports, the database application program 108 provides the software infrastructure for database maintenance, the library of word processing and desktop publishing application programs 110 provides the software infrastructure for forms and report maintenance, and the interface system 112 allows users, such as forms publishers and visitors entering form submissions, to access the forms engine 12 using a variety of different communication devices.

Specifically, the document handler 104 includes a forms wizard 120, a reports wizard 122, a forms uploader 124, and a reports uploader 126. The forms wizard 120 is an menu-driven utility designed to help users create forms. The forms wizard 120 typically includes a number of "canned" forms and an easy-to-use interface for creating forms. Similarly, the reports wizard 122 includes a number of "canned" report formats and an easy-to-use interface for creating reports. The reports wizard 122 also allows the form publisher to describe the relationships between the various data submission fields in a form and the report elements in the associated report. Additional details relating to specific operation of document wizards are well known those skilled in the art and will not be further described in this specification.

The forms uploader 124 typically includes a number of data conversion utilities for translating forms received in a variety of formats into a format supported by the library of word processing and desktop publishing application programs 110. These application programs are used to publish the forms on the server side of the forms handling system 10. For example, the library 110 may include an HTML application program (e.g., browser), a PDF application program (e.g., ADOBE ILLUSTRATOR), an MS WORD application program, a WORDPERFECT application program, and so forth. Similarly, the reports uploader 126 includes a number of data conversion utilities for translating reports received in a variety of formats into a format supported by the library of word processing or desktop publishing application programs 110. The reports uploader 126 also allows the form publisher to describe the relationships between the various data submission fields in a form and the report elements in the associated report. Alternatively, the forms engine 12 may include additional application programs to avoid the need to convert forms and reports into a compatible form. Additional details relating to specific operation of document uploaders are well known those skilled in the art and will not be further described in this specification.

The table loader 106 includes a processor for each document format represented in the library of word processing and desktop processing application programs 110. For example, the table loader 106 typically includes an HTML processor 130, a PDF processor 132, an MS WORD processor 134, a WORDPERFECT processor 134, and so forth. It should be noted that the table loader 106 may include a single processor if the document handler 104 converts all supported document types into a single format. In this case, the library 110 would include a single word processing or desktop processing application program. On the other hand, the table loader 106 requires multiple processors if the library 110 includes multiple word processing or desktop processing application programs. This configuration may be preferred because it allows the forms engine 12 to support multiple document formats without document conversion.

Each processor in the table loader 106 operates analogously for its respective document format. Specifically, each processor includes a look-up table correlating each possible data submission field type in a form supported by the processor (i.e., a form created using the corresponding application in the library 110) to a database field type supported by the database application program 108. This look-up table is created in advance and stored in association with the processor. To create a database table corresponding to a particular form, the processor parses the form to identify the names and field types for the data submission fields. The processor then looks up the corresponding database field type for each data submission field.

Alternatively, the look-up table may include a default database field type and a list of database field type options for each data submission field type. In this case, the processor prompts the form publisher to select a database field type from the options listed in the look-up table for each data submission field. If the user fails to select an option for a particular data submission field, the processor assigns the associated default database field type to that data submission field. The processor then renders a database table for the corresponding form, receives form logic from the publisher and enters this logic into the table as metadata, and receives filler data and populates the storage elements of the table with the filler data. The technique described above may be used to operate a processor in the table loader 106 for each word processing and desktop publishing program in the library 110.

The interface system 112 typically includes menu-driven voice or text recognition system configured to exchange data with a variety of user communication devices 114. For example, the interface system 112 typically includes a voice interface 140 configured to receive voice and DTMF data from a landline telephone, an e-mail interface 142 configured to receive text data and enclosed documents from a computer, an Internet interface 144 configured to receive HTML and XML data from a computer or digital broadband device, and a wireless interface 146 configured to receive voice, DTMF and overhead-channel data from a wireless communication device. Other types of interfaces may also be included to exchange data with other types of communication devices. Additional details relating to specific operation of data interfaces are well known those skilled in the art and will not be further described in this specification.

Figure 6:
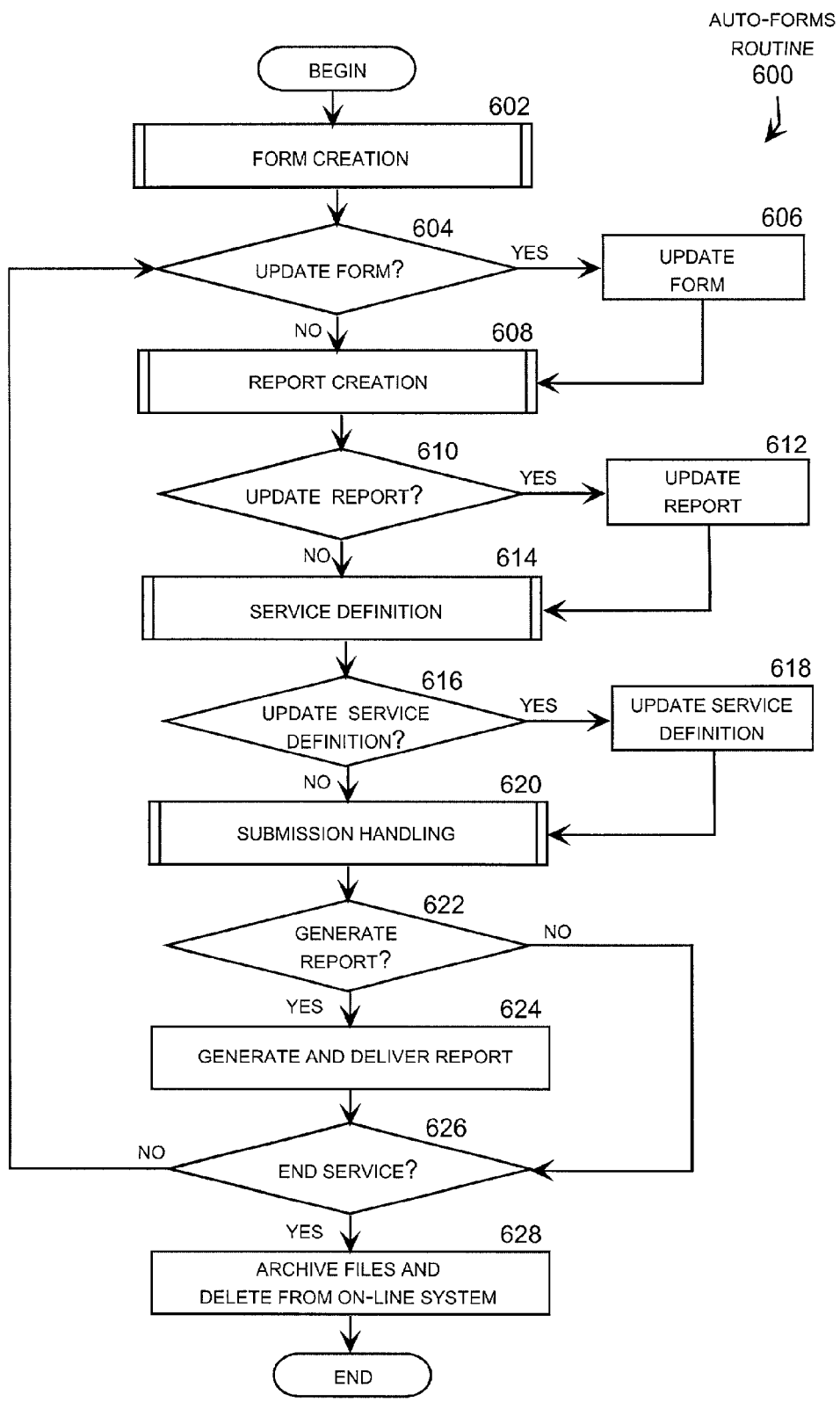
FIG. 6 is a logic flow diagram illustrating an auto-forms routine for an automatic forms handling system.

FIG. 6 is a logic flow diagram illustrating an auto-forms routine 600 for the automatic forms handling system 10. Routine 600 is typically implemented by the forms engine 12. In routine 602, the forms engine 12 creates forms for publication in connection with the forms handling system 10. That is, one or more form publishers may upload forms or create forms using the forms wizard 120. Routine 602 is described in greater detail with reference to FIG. 7A. Routine 602 is followed by step 604, in which the forms engine 12 determined whether a form is to be updated. If a form is to be updated, the "YES" branch is followed to step 606, in which the forms engine 12 updates a form. A form update may be implemented by replacing an existing form, creating a new form, or creating a change file for the updated form.

If a form is not to be updated, the "NO" branch is followed to step 608, in which the forms engine 12 creates a report. This report may be uploaded by the form publisher or created using the reports wizard 122. The forms engine 12 associates the report with the form created in step 602. Routine 608 is described in greater detail with reference to FIG. 8.

Routine 608 is followed by step 610, in which the forms engine 12 determines whether a report is to be updated. If a report is to be updated, the "YES" branch is followed to step 612, in which the forms engine 12 updates a report. A report update may be implemented by replacing an existing report, creating a new report, or creating a change file for the updated report.

If a report is not to be updated, the "NO" branch is followed to routine 614, in which the forms engine 12 prompts the forms publisher 22 for the service definitions 29. The service definitions 29 typically include form logic, a destination for delivering reports, instructions for report processing, submission handling criteria, payment criteria and method, and security criteria and methods. Routine 614 is described in greater detail with reference to FIG. 9.

Routine 614 is followed by step 616, in which the forms engine determines whether the service definitions 29 are to be updated. If the service definitions 29 are to be updated, the "YES" branch is followed to step 618, in which the forms engine 12 updates the service definitions. Service definitions 29 may be updated by replacing the existing service definitions, creating new service definitions, or creating a change file for the updated service definitions. If service definitions 29 are not to be updated, the "NO" branch is followed to routine 620, in which the forms engine 12 performs submission handling. In the submission handling routine 620, the forms engine receives and validates form submissions from visitors. Routine 620 is described in greater detail with reference to FIG. 10.

Routine 620 is followed by step 622, in which the forms engine determines whether to generate a report. If a report is to be generated, the "YES" branch is followed to step 624, in which the forms engine 12 generates and delivers the report in accordance with the service definition. Those skilled in the art will appreciate that the forms handling system may be configured to perform a wide variety of sophisticated analyses on the data maintained in the database table 18 to produce the report. Additionally, the publisher of the report may specify a variety of destinations for the report, such as storage on the forms handling system, e-mail delivery, voice delivery (voice reports), or hard copy delivery to a specified location.

If a report is not to be generated, the "NO" branch is followed to step 626, in which the forms engine 12 determines whether to discontinue service. If service is not to be discontinued, the "NO" branch is followed to step 604 and the search engine processes another form. If the service is to be discontinued, the "YES" branch is followed to step 628. In step 628, the files are archived and deleted from the on-line system to free the system resources for use by other form publishers. Step 628 is followed by the "END" step, which concludes routine 600.

Figure 7A:
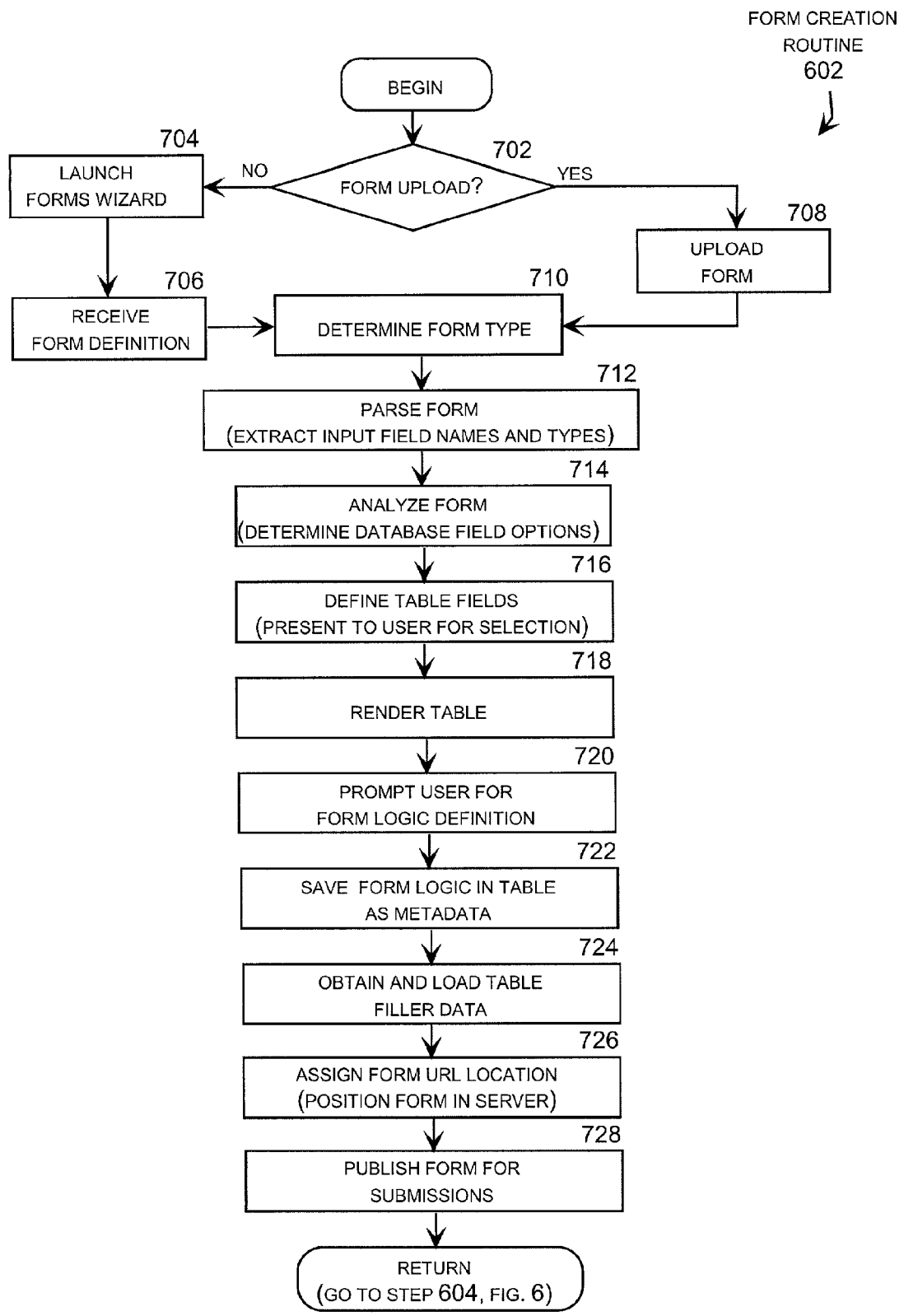
FIG. 7A is a logic flow diagram illustrating a form creation routine for an automatic forms handling system.

FIG. 7A is a logic flow diagram illustrating form creation routine 602. Routine 602 follows the "BEGIN" step shown on FIG. 6. In step 702, the forms engine 12 determines whether a form is to be uploaded or created on-line with the assistance of the forms wizard 120. If the form is to be created on-line with the assistance of the forms wizard 120, the "NO" branch is followed to step 704, in which the forms engine 12 causes the document handler 104 to launch a forms wizard 120. The forms wizard 120 is a menu-driven utility designed to help users create forms. Step 704 is followed by step 706, in which the forms wizard 120 prompts the form publisher to create the data entry form 14. The data entry form 14 includes one or more data submission fields configured to receive visitor's input. FIG. 2 is an example of a data entry form that may be generated by the forms wizard 120. Those skilled in the art will appreciate that numerous variations of the data entry forms can be created. The forms wizard 120 creates the form in a format supported by at least one of the application programs contained in the library 110, as selected the form publisher 22.

If a remote form publisher 22 uploads a form, the "YES" branch is followed from step 702 to step 708. In step 708, the document handler 104 receives the uploaded form. The form can be uploaded in a variety of formats, such as HTML, XML, PDF, or various word processor formats. The uploader 124 typically accepts any form created with a compatible version of one of the word processing or desktop application programs included in the library 110, assigns a URL-based location identifier to the form, and stores the form in the forms database 14. The uploader 124 may query the form publisher to specify the desired URL based location identifier on the forms handling system server. If the form publisher is an existing customer of the forms handling system, the uploader 124 may optionally assign the URL based location identifier to the current form with the same URL based location identifier of that customer's previously published forms. In addition, the uploader 124 may convert a received form into a format supported one of the word processing or desktop application programs included in the library 110. Steps 706 and 708 are followed by step 710, in which the forms engine 12 determines the form's format.

In step 710, the document handler 104 receives the form created by the forms wizard 120 or uploaded by the form publisher 22. Now that the newly created form is in the forms handling system, the forms engine 12 analyzes the format of the form in order to choose the proper application that is needed to parse the form. Step 710 is followed by step 712, in which the search engine 22 parses the form. When parsing, the search engine 22 extracts the input field names and the data submission field types. Submission field types include but are not limited to buttons, pick lists, check boxes, text lines, and text areas. Each submission field type has a corresponding database field type, such as integer, decimal, character, text, or date-time, supported by the database application program. Step 712 is followed by step 714, in which the forms engine 22 retrieves the available database field types from the look-up table for each data submission field. FIG. 7B is an example of a look-up table that lists the submission form field types, the corresponding database field options, and the default database field types. Step 714 is followed by step 716, in which the available options for the database field types for each submission field type is presented to the form publisher 22. If the form publisher fails to select an option for a particular data submission field, the associated default database field type can be assigned. Step 716 is followed by step 718, in which the forms engine 22 creates a database table associated with the created form. The forms engine 22 should create a storage element in the database table corresponding to each data submission entry on the form. The format of each storage element has been previously defined by its assigned data field type. When a submission occurs, the forms engine 22 will add the submission entry data to the appropriate storage elements in database table. FIG. 3 is an example of a database table that may be created by the forms engine 22. In FIG. 3, the columns represent the storage elements that receive the corresponding form data upon each submission.

Step 718 is followed by step 720, in which the forms publisher 22 is prompted to specify the form logic for the various data submission fields, such as data types and ranges. Additionally, the form publisher 22 may include logic for the form submission, such as the required fields. Step 720 is followed by step 722, in which the forms engine 22 stores the form logic corresponding to the data entry fields in the database table associated with the that form. Step 722 is followed by step 724, in which the forms engine 22 obtains filler data from the forms publisher and populates the storage elements of the table with filler data.

Step 724 is followed by step 726. In step 726, the forms engine may determine a location on the server to store the form if a URL location identifier was not assigned by the uploader 124 (see step 708). If not previously assigned, the forms engine 22 assigns a URL location identifier to the current form. The forms engine 22 may query the form publisher to specify the desired URL based location identifier on the forms handling system server. If the form publisher is an existing customer of the forms handling system, the forms engine 22 may automatically assign the URL based location identifier for the current form with the same URL based location identifier of that customer's previously published forms. Step 726 is followed by step 728, in which the form is published for access and is able to receive submissions by visitors. After step 728, the routine returns to step 604 of FIG. 6.

FIG. 7B illustrates an example of a correlation table 740 for associating form field types 742 with database field types 746 in an automatic forms handling system. The table also contains default database field types 744 for each submission field type 742. In this example, the submission form field type of a "BUTON" 748 has an associated database field options of "INTEGER" or "DECIMAL." If the form publisher does not choose a database field type, the default "INTEGER" field type will be assigned. Similarly, the submission form field type of a "PICK LIST" 750 has an associated database field options of "INTEGER" or "DECIMAL." If the form publisher does not choose a database field type, the default "INTEGER" field type will be assigned. Likewise, the submission form field type of a "CHECK BOX" 752 has an associated database field options of "INTEGER" or "DECIMAL." If the form publisher does not choose a database field type, the default "INTEGER" field type will be assigned. And again, the submission form field type of a "TEXT LINE" 754 has an associated database field options of "CHARACTER," "TEXT," or "DATE-TIME." If the form publisher does not choose a database field type, the default "WORD" field type will be assigned. The correlation table will list the various other possible submission form field types and corresponding database field types and defaults. In this example, the last submission form field type is "TEXT AREA" 756. The submission form field type of "TEXT AREA" 756 has an associated database field options of "CHARACTER," "TEXT," or "DATE-TIME." If the form publisher does not choose a database field type, the default "FREE TEXT" field type will be assigned. It will be understood that the table could include a wide variety of form field types and associated database field types in addition to those illustrated.

FIG. 8 is a logic flow diagram illustrating a report creation routine 608. Routine 608 follows steps 604 or 606 shown on FIG. 6. In step 802, the forms engine 12 determines whether a report is to be uploaded or created by a forms wizard. If the forms publisher 22 does not upload a report, the "NO" branch is followed to step 804, in which the document handler 104 launches a reports wizard 122. The reports wizard 122 is an on-line menu-driven utility designed to help users create reports. Step 804 is followed by step 806, in which the reports wizard 122 prompts the form publisher 22 for the report specifications. The report specifications describe the relationships between the various data submission fields in the form and the report elements in the associated report. The report specifications can include a title for each report table, the label associated with each report element, and the format desired for each report element.

If a remote form publisher 22 uploads the report, the "YES" branch is followed from step 802 to step 808. In step 808, the document handler 104 receives the uploaded report. The report can be uploaded in a variety of formats which typically include HTML, XML, PDF, or various word processor formats. Step 808 is followed by step 810, in which the uploader 126 analyzes the report to determine the report type. If the report is uploaded in format that is not supported by one of the applications in the library 110, the uploader 126 uses a conversion utility to convert the report into a format that is supported by the library 110.

Step 810 is followed by step 812, in which the form publisher is prompted to specify the report logic. The report logic stipulates how to manipulate the storage elements to create the various report elements. The manipulation of the storage elements can vary from simple averaging to complex statistical analysis. The report also may require graphical data representations, pie charts, animation, and so forth. Step 812 is followed by step 814, in which the forms engine correlates the report elements with storage elements for the associated form. Step 814 is followed by step 816, in which the forms engine saves the form logic and the form logic table correlation in the database table for the associated form.

Step 816 is followed by step 818, in which the forms engine renders the report. When rendering the report, all of the required storage elements manipulations are performed and the data is presented as per the form publisher's specifications. Step 820 is followed by step 820, in which the forms engine allocates storage area on the server and designates a URL location identifier to enable the form publisher to access the report. Step 822 is followed by step 824, in which the reports is delivered to the form publisher by any of various means. The report may be stored on the forms handling system server, e-mailed to the form publisher, a hard copy may be mailed to a specified location, or any other delivery method specified by the forms publisher 22. After step 824, the routine return to step 610 of FIG. 6.

Figure 9:
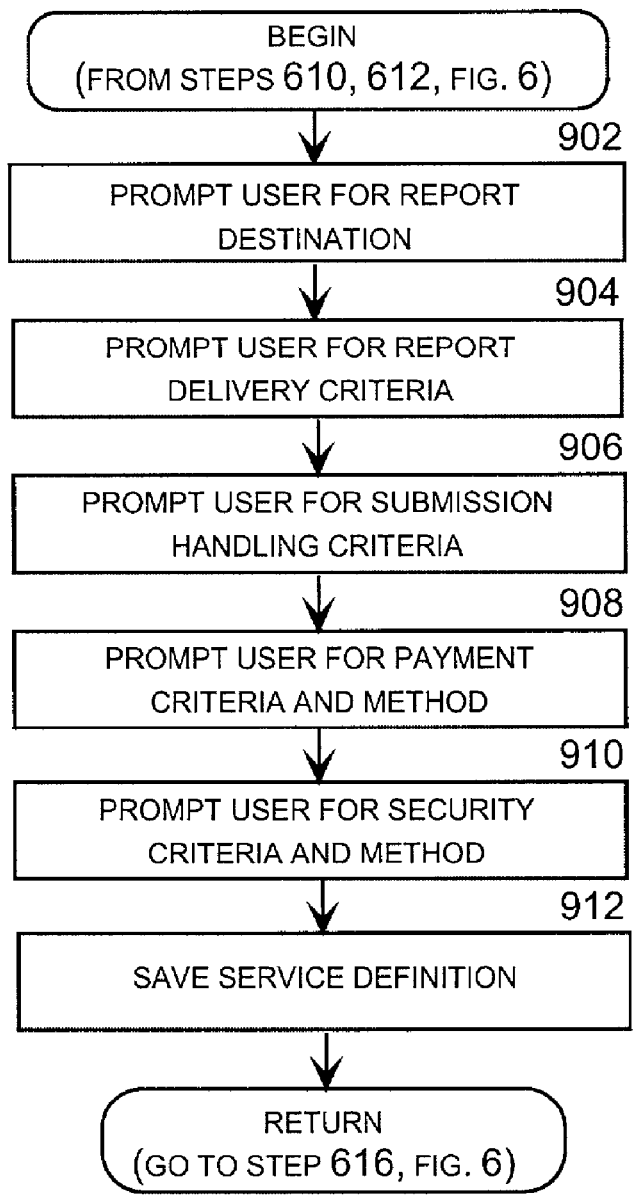
FIG. 9 is a logic flow diagram illustrating a service definition routine for an automatic forms handling system.

FIG. 9 is a logic flow diagram illustrating a service definition routine 614. Routine 614 follows steps 610 or 612 shown in FIG. 6. In step 902, the forms engine 12 prompts the form publisher 22 for the report destination. Many options exist for the delivery of the report. The report may remain on the forms handling system and located by an URL generated by the forms engine 12. The report may be e-mailed, a hard copy may be delivered, or the report may be delivered on a digital storage device. Other methods than those listed can be used to deliver the report to the form publisher.

Step 902 is followed by step 904, in which the forms engine prompts 12 the form publisher for the report delivery criteria. Typical criteria may include requirements to generate the report after a preset number of visitor submissions, after a set time period like monthly, after the sum of a storage element reaches a preset limit, or after the form publisher 22 calls or uses the Internet to request a report. Obviously, the form publisher may specify a wide spectrum of criteria for when the forms handling system should generate a report.

Step 904 is followed by step 906, in which the forms engine prompts the form publisher 22 for the submission handling criteria. The form publisher may specify that the form engine does not record a submission if that particular visitor has previously entered a submission. Similarly, the forms publisher may specify that the forms engine should not record a submission unless certain data entry fields satisfy preset values like the visitor owns a certain brand of automobile with a household income exceeding fifty thousand dollars ($50,000). The form publisher may desire to pre-approve all submissions. In this case, the forms handling system will e-mail the submission data or otherwise notify the form publisher and only record the submission upon approval. During the submission screening, the form publisher can modify data before it gets recorded to fix minor problems instead of discarding the submissions. Additionally, the form publisher may add private notations or other desired information to the submission. And again, the form publisher 22 may specify a wide range of submission criteria before the forms engine records the visitor's submission.

Step 906 is followed by step 908, in which the forms engine 12 prompts the form publisher 22 for the payment criteria and method. Naturally, many payment plans and payment methods can be instituted for providing the forms handling system services. The form publisher 22 may be billed monthly, for each report generated, for every preset number of visitor that submit submissions, or any other mutually agreed method.

Step 908 is followed by step 910, in which the forms engine prompts the form publisher 22 for the security criteria and method. Most form publisher will want to control who may access the information or who may request updates to the forms or reports. The forms handling system will be equipped to handle authentication, encryption, and other security requirements of the form publisher.

Step 910 is followed by step 912, in which the forms engine saves the service definition as metadata in the database table associated with that form. After saving the metadata, the system returns to step 616 of FIG. 6.

Figure 10:
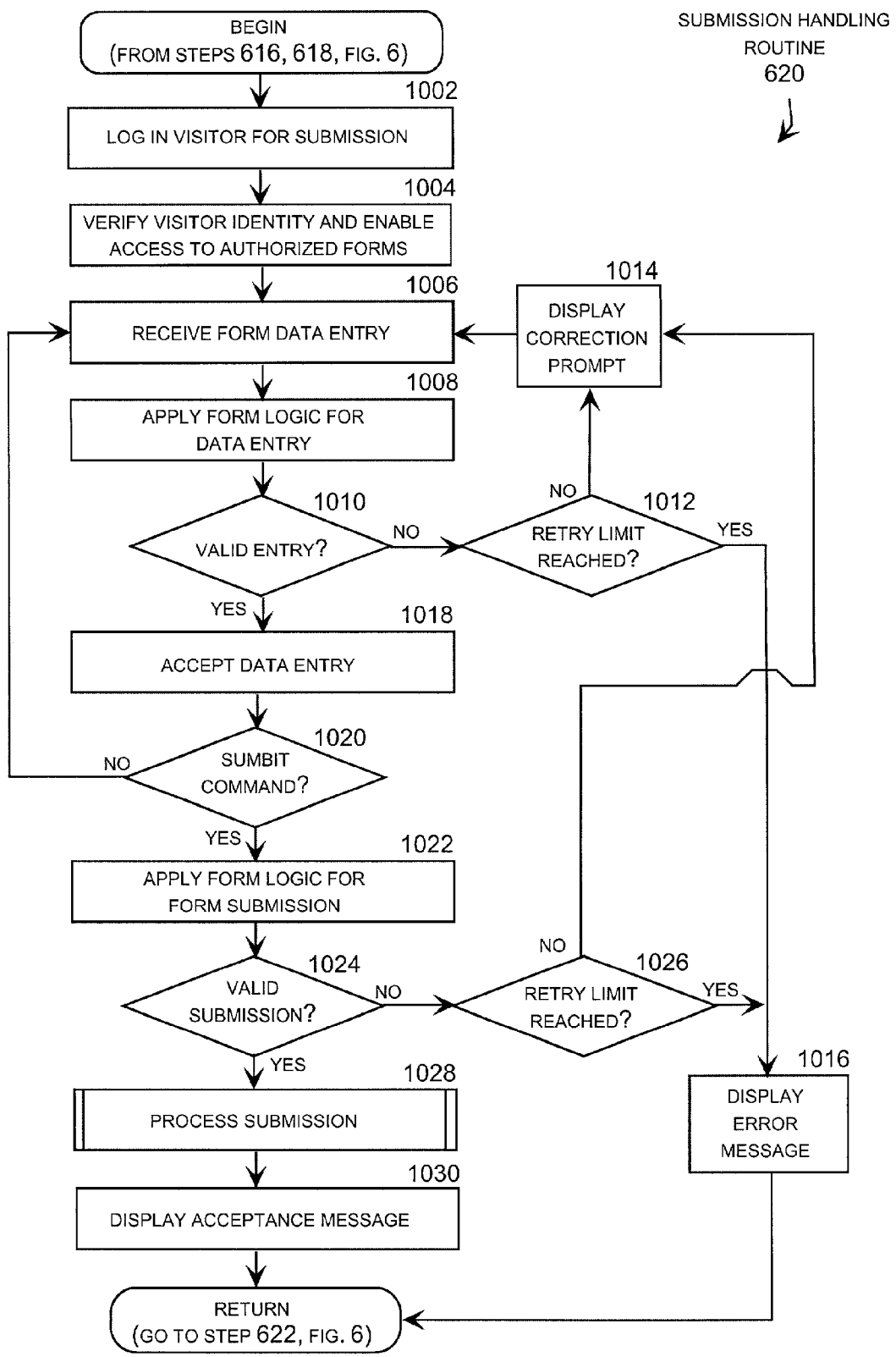
FIG. 10 is a logic flow diagram illustrating a submission handling routine for an automatic forms handling system.

FIG. 10 is a logic flow diagram illustrating a submission handling routine 620. Routine 620 follows steps 616 or 618 shown in FIG. 6. In step 1002, the forms handling system logs in the visitor to the system's server. Step 1002 is followed by step 1004, in which the visitor identity is verified, and the visitor is enabled to access the forms. The visitor identity may be verified by the use of passwords, personal data, HTTP cookies, digital, certificates, or by other means specified by the form publisher 22.

Step 1004 is followed by step 1006, in which the forms engine receives the form data entered by the visitor. Step 1006 is followed by step 1008, in which the forms engine applies the required logic to each data entry field. Step 1008 is followed by step 1010, in which the search engine determines if the data entered was a valid entry.

If the data entered was not valid, the "NO" branch is followed to step 1012, in which the retry limit for a data entry is queried. If the retry limit has not been reached, the "NO" branch of step 1012 is followed to step 1014. In step 1014, the forms engine displays a correction prompt and the data entry field is enabled to accept the corrected data. Step 1014 is followed by step 1006, in which the corrected data entry is received by the forms engine. If the retry limit has been reached, the "YES" branch is followed from step 1012 to step 1016. In step 1016, the forms engine displays the applicable error message. After step 1016, the routine returns to step 622 of FIG. 6. If the data entered was valid, the "YES" branch is followed from step 1010 to step 1018. In step 1018, the forms engine accepts the data entry and proceeds to step 1020. In step 1020, the forms engine checks to see if the submit the data command has tendered.

If the submit the data command has not been tendered, the "NO" branch is followed from step 1020 to step 1006. In step 1006, the forms engine receives another data entry. If the submit the data command has been tendered, the "YES" branch is followed from step 1020 to step 1022. In step 1022, the forms engine applies the specified form logic for the form submission. Step 1022 is followed by step 1024, in which the forms engine determines if the criteria has been met for a valid submission.

If a valid submission criteria has not been met, the "NO" branch of step 1024 is followed to step 1026. In step 1026, the forms engines determines whether the retry limit for a valid submission has been reached. If the submission retry limit has not been met, the "NO" branch of step 1026 is followed to step 1014, in which a correction prompt is displayed. Step 1014 is followed by step 1006, in which a corrected data entry is received form the visitor. If the submission retry limit has been exceeded, the "YES" branch of step 1026 is followed to step 1016. In step 1016, an error message is displayed about the retry limit for a valid submission has been exceeded. After step 1016, the routine continues to step 622 of FIG. 6.

If the submission was valid, the "YES" branch of step 1024 is followed to routine 1028, in which the forms engine processes the submission. Routine 1028 is described in greater detail with reference to FIG. 11. Routine 1028 is followed by step 1030, in which the forms engine displays a message stating the submission has been accepted. Following step 1030, the routine returns to step 622 of FIG. 6.

Figure 11:
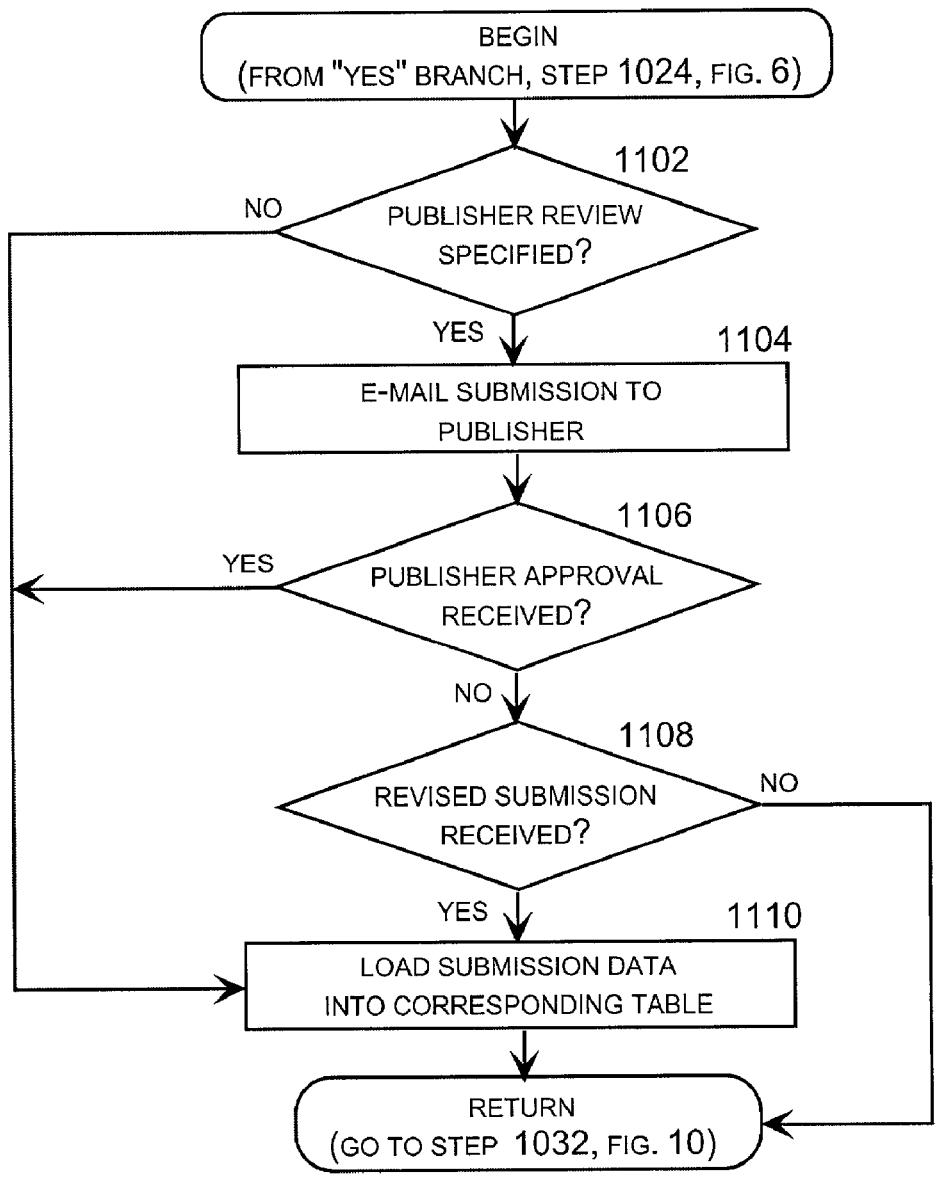
FIG. 11 is a logic flow diagram illustrating a submission processing routine for an automatic forms handling system.

FIG. 11 is a logic flow diagram illustrating a submission processing routine 1028. Routine 1028 follows step 1024 shown in FIG. 10. In step 1102, the forms engine queries the metadata of the database table to determine if the form publisher 22 review is required before recording the data submission. If the form publisher 22 review is not required, the "NO" branch of step 1102 is followed to step 1110. In step 1110, the forms engine proceeds to record the submission into the database table that corresponds to the published form. After step 1110, the routine returns to step 1032 of FIG. 10. If the form publisher 22 review is required, the "YES" branch of step 1102 is followed to step 1104. In step 1104, the submission data is e-mailed to the form publisher 22 for review. Step 1104 is followed by step 1106, in which the forms engine 12 determines if the form publisher 22 has approved the data submission for recordation.

If the form publisher 22 has approved the data submission, the "YES" branch of step 1106 is followed to step 1110. In step 1110, the forms engine proceeds to record the submission into the database table that corresponds to the published form. After step 1110, the routine returns to step 1032 of FIG. 10. If the form publisher 22 has not approved the data submission, the "NO" branch of step 1106 is followed to step 1108. In step 1108, the forms engine determines whether a revised submission has been received. If a revised submission has not been received, the "NO" branch is followed, and the routine returns to step 1032 of FIG. 10. If a revised submission has been received, the "YES" branch is followed to step 1110. In step 1110, the forms engine proceeds to record the revised submission into the database table that corresponds to the published form being utilized. After step 1110, the routine returns to step 1032 of FIG. 10.

In view of the foregoing, it will be appreciated that the invention provides an advantageous forms administration system. It should be understood that the foregoing relates only to the illustrated embodiments of the invention, and that numerous changes may be made therein without departing from the spirit and scope of the invention as defined by the following claims.

The invention claimed is:

1. A computerized method for handling forms, comprising the steps of:
   receiving a form from a form publisher comprising data submission fields configured to receive user input;
   automatically processing the form to identify the data submission fields;
   automatically correlating each data submission field to a database field type supported by a database application;
   automatically creating one or more database tables or other database structures in the database application corresponding to the form, each of the one or more database structures comprising a storage element corresponding to each data submission field; automatically publishing the form to receive form submissions comprising data entries into the data submission fields;
   receiving one or more form submissions; and
   automatically entering the data entries of the form submissions into the corresponding storage elements of the database.

2. The method of claim 1, further comprising the steps of:
   receiving a report file associated with the form, the report file comprising report elements associated with the storage elements of the database;
   computing the report elements from the data entries associated with the storage elements of the database;
   rendering a report using the report file; and
   delivering the report to a specified location.

3. The method of claim 2, wherein the step of receiving the report comprises the step of uploading the report.

4. The method of claim 2, wherein the step of receiving the report file comprises the step of:
   launching a reports wizard; and
   receiving user commands to the forms wizard to create the report.

5. The method of claim 1, wherein the step of receiving the form comprises the step of uploading the form.

6. The method of claim 1, wherein the step of receiving the form comprises the step of:
launching a forms wizard; and
receiving user commands to the forms wizard to create the form.

7. The method of claim 1, wherein the step of processing the form to identify the data submission fields comprises the steps of:
parsing the form to identify the data submission fields;
determining a field type associated with each data submission field; and
determining a name associated with each data submission field.

8. The method of claim 1, wherein the step of correlating each data submission field to a database field type supported by a database application comprises the steps of:
determining a field type associated with each data submission field;
looking up a database field type corresponding to each data submission field; and
correlating each data submission field with its corresponding database field type.

9. The method of claim 1, further comprising the steps of:
determining a field type associated with each data submission field;
looking up a default database field type and a list of database field type options corresponding to each data submission field;
prompting the form publisher to enter a selected database field type from the list of database field type options for each data submission field; and
correlating each data submission field with its corresponding selected database field type.

10. The method of claim 1, further comprising the steps of:
receiving a report file associated with the form, the report file comprising report elements associated with the storage elements of each database structure;
receiving a service definition comprising instructions for producing and delivering reports based on the report file;
determining from the instructions that a report should be generated;
computing the report elements from the data entries associated with the storage elements of the database structure;
rendering a report using the report file; and
delivering the report to a specified location.

11. The method of claim 1, further comprising the steps of:
forwarding the form submissions to the form publisher for review; and
receiving approval of the form submissions prior to the entering of the data entries of the form submissions into the corresponding storage elements of the database.

12. The method of claim 1, further comprising the steps of:
receiving form logic defining conditions associated with any receipt of form submissions using the form;
saving the form logic in association with the database corresponding to the form; and
applying the form logic when receiving form submissions using the form.

13. The method of claim 12, wherein the form logic comprises:
conditions defining valid data entries for individual data submission fields; and
conditions defining a valid form submission based on a combination of data entries for several data submission fields.

14. A tangible computer storage medium storing computer-executable instructions for performing the method of claim 1.

15. A tangible computer-controlled apparatus configured to perform the method of claim 1.

16. A computerized method for handling forms, comprising the steps of:
receiving a form from a form publisher comprising data submission fields configured to receive user input;
automatically processing the form to identify the data submission fields;
automatically correlating each data submission field to a database field type supported by a database application by determining a field type associated with each data submission field, looking up a database field type corresponding to each data submission field, and correlating each data submission field with its corresponding database field type;
automatically creating a database structure in the database application corresponding to the form, the database structure comprising storage elements corresponding to the data submission fields;
automatically publishing the form to receive form submissions comprising data entries into the data submission fields;
receiving one or more form submissions;
automatically entering the data entries of the form submissions into the corresponding storage elements of the database;
receiving a report file associated with the form, the report file comprising report elements associated with the storage elements of the database;
receiving a service definition comprising instructions for producing and delivering reports based on the report file;
determining from the instructions that a report should be generated;
computing the report elements from the data entries associated with the storage elements of the database;
rendering a report using the report file; and
delivering the report to a specified location.

17. The method of claim 16, further comprising the steps of:
forwarding the form submissions to the form publisher for review; and
receiving approval of the form submissions prior to the entering of the data entries of the form submissions into the corresponding storage elements of the database.

18. The method of claim 16, further comprising the steps of:
receiving form logic defining conditions associated with any receipt of form submissions using the form;
saving the form logic in association with the database corresponding to the form; and
applying the form logic when receiving form submissions using the form.

19. The method of claim 18, wherein the form logic comprises:
conditions defining valid data entries for individual data submission fields; and conditions defining a valid form submission based on a combination of data entries for several data submission fields.

20. A tangible computer storage medium storing computer-executable instructions for performing the method of claim 16.

21. A tangible computer-controlled apparatus configured to perform the method of claim 16.

22. A tangible computer-readable medium storing computer-executable instructions comprising:
- a document handler operable for receiving forms and associated report files, each form comprising data submission fields configured to receive user input, and each report file comprising report elements associated with the data submission fields of a corresponding form;
- a forms database operable for storing a plurality of forms received through the document handler;
- a reports database operable for storing a plurality of reports received through the document handler;
- a table loader operable for automatically creating a database structure corresponding to each form, each database structure comprising a storage elements corresponding to the data submission fields in a corresponding form; and
- a forms manager operable for receiving one or more form submissions associated with each form and automatically entering data entries received through the form submissions into the corresponding database structure, wherein the forms manager is further operable for receiving a service definition associated with each form, and for automatically producing and delivering reports based on the report files and database structures corresponding to each form in accordance with instructions contained in the corresponding service definition.

23. The computer-readable medium of claim 22, further comprising an interface system operable for receiving the service definitions from one or more user communication devices selected from the group consisting of:
- a landline telephone;
- a wireless telephone;
- a computer; and
- a digital broadband device.

24. The computer-readable medium of claim 22, wherein the document handler is operable for processing documents in a format selected from the group consisting of:
- an HTML document;
- a PDF document;
- an XML document; and
- a word processing document.

25. A tangible computer-controlled apparatus comprising the computer storage medium of claim 22.

* * * * *